T. HOLLAND.
Oil-Cup.
No. 206,672.          Patented Aug. 6, 1878.
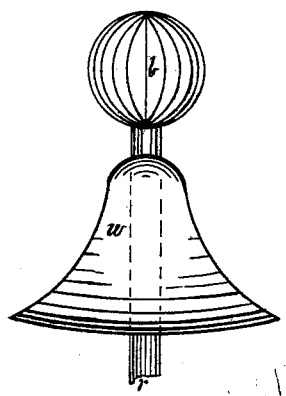
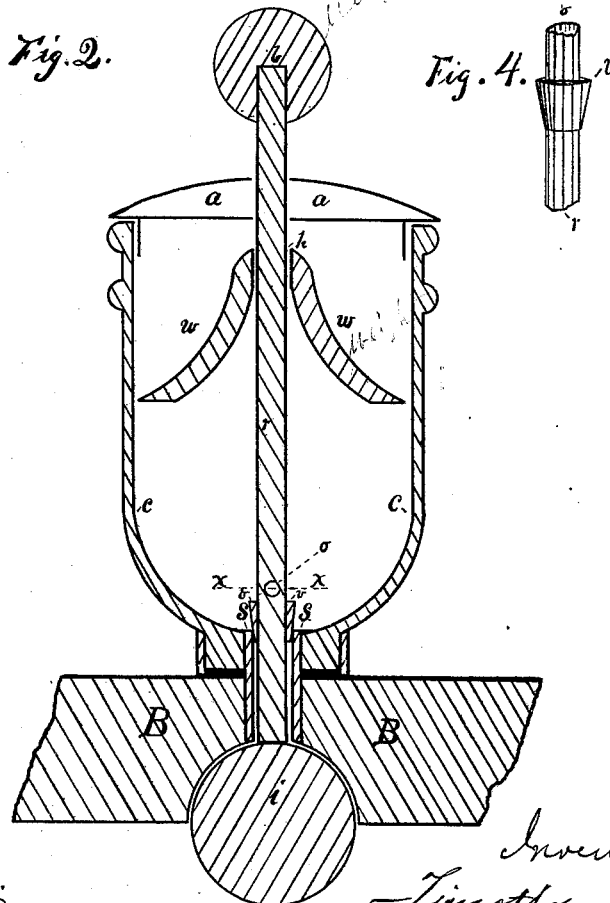

UNITED STATES PATENT OFFICE.

TIMOTHY HOLLAND, OF TROY, NEW YORK.

IMPROVEMENT IN OIL-CUPS.

Specification forming part of Letters Patent No. 206,672, dated August 6, 1878; application filed December 20, 1877.

*To all whom it may concern:*

Be it known that I, TIMOTHY HOLLAND, of the city of Troy, in the county of Rensselaer and State of New York, have invented a new and useful Improvement in Oil-Cups, which improvement is fully set forth in the following specification, reference being had to the accompanying drawings.

The object of my invention is to utilize the lubricant used in lubricating the journals of machinery, at the proper time and in necessary quantities, automatically without waste.

Figure 1 represents my invention in perspective. Fig. 2 represents a section of a journal, journal-box, and oil-cup embodying my invention. Fig. 3 is a sectional representation of a tube, $r$, perforated with one or more holes of suitable size on the line $x\ x$. Fig. 4 is a perspective of a conical valve, $r$, sliding adjustably upon the stem S, the purpose of which is to close or partly close the opening at the upper end of the stem S, as may be desired.

$i$ is a journal; B, a journal-box, and S a cylindrical stem, attached to the base of the cup C and inserted into the cap of the box B centrally above the shaft or journal $i$. $a$ is a cup-cover, perforated at its center with a hole of sufficient size to allow the tube $r$ to slide freely through the same. Said tube is supplied at one end with a ball or weight, $b$; also, with an opening or hole, $o$, on the line $x\ x$, Fig. 2, through which the lubricating compound may flow to the inner part of the tube, and thence to the journal $i$, as fast as the same is melted. One or more openings, $o$, in the tube $r$ may be employed, and at any number of points required.

$w$ is a weight, supplied at its center with a hole, $h$, through which the tube $r$ may be passed at pleasure.

To enable others to comprehend the nature and use of my invention more fully, I will add that it is not intended to use liquid oils in connection with my invention, but, instead, a plastic lubricating compound prepared by me expressly for that purpose. The cup being nearly filled with the compound, insert the tube $r$ through the cover $a$, weight $w$, and adjustable valve $r$. Then insert the open end of the tube $r$ through the compound into the cylindrical stem S until the end rests upon and in contact with the journal $i$. Press the weight $w$ down upon the grease and cover the cup.

It would be obvious that when the journal turns friction with the metal tube $r$ results, and heat commensurate with the rapidity of its revolution must be evolved and to an extent conducted through the tube $r$ to the lubricating compound surrounding it, which in turn will melt and flow in through the holes $o$ upon the journal whenever and in quantities actually needed.

The purpose of the weight $w$ is to press the lubricant down around the tube $r$ as fast as it melts away.

The purpose of the ball $b$ upon one end of the tube $r$ is to supply sufficient pressure to the tube to insure sufficient friction upon the opposite end thereof for the purpose desired.

Having described my invention, I claim as new and desire to secure by Letters Patent—

The conical valve sliding adjustably upon the tube $r$, in combination with said tube and an oil-cup, substantially as and for the purposes described.

TIMOTHY HOLLAND.

Witnesses:
FRANK H. BRYAN,
L. R. BECKLEY.